United States Patent [19]
Cooper et al.

[11] Patent Number: 6,052,442
[45] Date of Patent: Apr. 18, 2000

[54] INTERNET ANSWERING MACHINE

[75] Inventors: R. Ross Cooper, La Mesa; Robert T. Kulakowski, Leucadia, both of Calif.

[73] Assignee: Internet Magic, Inc., San Diego, Calif.

[21] Appl. No.: 08/978,214

[22] Filed: Nov. 25, 1997

Related U.S. Application Data

[63] Continuation of application No. 08/554,744, Nov. 7, 1995, abandoned.

[51] Int. Cl.[7] .................................................. H04M 1/64
[52] U.S. Cl. .................................... 379/88.19; 379/93.24
[58] Field of Search ............................. 379/67.1, 88.12, 379/88.17, 88.19, 88.2, 88.21, 90.01, 93.01, 93.24, 142

[56] References Cited

U.S. PATENT DOCUMENTS

| | | |
|---|---|---|
| 3,701,850 | 10/1972 | Ando . |
| 4,803,717 | 2/1989 | Marui . |
| 4,837,797 | 6/1989 | Freeny, Jr. . |
| 4,935,954 | 6/1990 | Thompson et al. ........................ 379/89 |
| 5,172,404 | 12/1992 | Hashimoto . |
| 5,243,642 | 9/1993 | Wise, Jr. et al. . |
| 5,278,896 | 1/1994 | Sakata et al. . |
| 5,313,516 | 5/1994 | Afshar et al. . |
| 5,333,152 | 7/1994 | Wilber . |
| 5,333,266 | 7/1994 | Boaz et al. . |
| 5,384,832 | 1/1995 | Zimmerman et al. . |
| 5,390,236 | 2/1995 | Klausner et al. . |
| 5,392,332 | 2/1995 | Core et al. . |
| 5,396,546 | 3/1995 | Remillard . |
| 5,398,280 | 3/1995 | Macconnell . |
| 5,400,393 | 3/1995 | Knuth et al. . |
| 5,402,466 | 3/1995 | Delahanty . |
| 5,418,628 | 5/1995 | Perkins . |
| 5,452,289 | 9/1995 | Sharma et al. . |
| 5,526,408 | 6/1996 | Yekutiely . |
| 5,557,659 | 9/1996 | Hyde-Thompson . |
| 5,568,540 | 10/1996 | Greco et al. . |
| 5,579,472 | 11/1996 | Keyworth, II et al. . |
| 5,608,786 | 3/1997 | Gordon . |
| 5,727,047 | 3/1998 | Bentley et al. ............................ 379/93 |
| 5,757,891 | 5/1998 | Wang ................................... 379/93.24 |
| 5,822,692 | 10/1998 | Krishan et al. ......................... 455/419 |

FOREIGN PATENT DOCUMENTS 0330856  6/1989  European Pat. Off. .

OTHER PUBLICATIONS

Palaniappan et al., InternetExpress: An inter–Desktop Multimedia Data–Transfer Service, IEEE, Oct. 10, 1991, pp. 58–67.

*Primary Examiner*—Scott L. Weaver
*Attorney, Agent, or Firm*—Knobbe, Martens, Olson & Bear, LLP

[57] ABSTRACT

An answering machine receives and records both voice and email messages. The answering machine includes a telephone line interface, a modem, a processor, memory for storing the processor software and recording the messages, a speaker, a display and a keypad. When the answering machine detects a ring signal on the telephone line to which it is connected, it answers the call. The answering machine plays an outgoing message for the caller to hear and records the caller's incoming voice message. Periodically or at predetermined times, the answering machine may check for email messages by calling a service provider. When the service provider answers the call, the answering machine logs in, downloads and stores at least a portion of email messages that have been received. A user can view the display and review the messages. Voice mail messages are played through the speaker, and email messages are provided on the display.

5 Claims, 7 Drawing Sheets

3 MESSAGES HAVE BEEN RECEIVED /16

| FROM | TYPE | SUBJECT | DATE | TIME |
|---|---|---|---|---|
| 619-555-1234 | VOICE | <NONE> | 10-01-95 | 8:30 AM |
| <UNKNOWN> | VOICE | <NONE> | 10-01-95 | 9:15 AM |
| ROBIN@CR.COM | EMAIL | HELLO BOB | 10-01-95 | 9:42 AM |

*FIG. 4*

INTERNET ANSWERING MACHINE

This application is a continuation of U.S. patent application Ser. No. 08/554,744, filed Nov. 7, 1995 now abandoned.

BACKGROUND OF THE INVENTION

A telephone answering machine is an electronic device that automatically answers an incoming telephone call, plays a pre-recorded message, and records a message that the caller leaves. The machine typically has one or two magnetic tape cassettes or a digital memory for storing the outgoing and incoming messages. The machine may have a display for indicating the number of messages received and the time and date they were received. A user can listen to the recorded messages using controls on the machine or via a remote telephone connection by pressing keys on the remote telephone keypad.

Although an answering machine is traditionally a dedicated, integrated device that plugs into the telephone line, a general-purpose personal computer may also perform the above-described answering machine functions. Circuit cards and associated software to facilitate answering machine functions are commercially available for personal computers. As a result, the computer may display on its screen the number of received messages and time of day they were received and may play back the recorded messages through its speakers.

An increasingly common method for sending messages is known as electronic mail ("email"). A person can use a remote computer and modem to send messages to a central computer via a telephone connection. The central computer stores the message as well as the identity of the sender and intended recipient. The recipient can use another remote computer and modem to establish a telephone connection with the central computer and read or download any messages stored there that are intended for him to receive. An email message generally includes ASCII-encoded text and may also include an "attachment" consisting of a digitized image or digitized audio (voice). Companies having such central computers that facilitate email communication between remote users are known generally as "on-line service providers." People who wish to use the email service pay fees to the on-line service provider and are known as subscribers or customers. Examples of well-known on-line service providers include COMPUSERVE, PRODIGY, AMERICA ON-LINE, FIDONET and BITNET.

Many on-line service providers also provide access to the computer network known as the Internet. The Internet is a global super-network comprising numerous sub-networks. The service provider maintains a computer on one of the sub-networks that functions as a "gateway" onto the Internet for its customers' computers. People all over the world can send and receive email with each other through service providers that provide Internet gateways. Service providers use standard, well-known protocols to send and receive email via the Internet, such as Simple Mail Transfer Protocol (SMTP) and Post Office Protocol (POP), which are part of the suite of over 100 protocols known as Transmission Control Protocol/Internet Protocol (TCP/IP). They may also use TELESCRIPT protocols developed by General Magic Corp. of Sunnyvale, Calif. Although the most common method by which individuals access the Internet is via a service provider's gateway, any computer having the necessary hardware and software can be connected directly to the Internet.

An email message comprises a header, which includes the sender's address (source address) and the recipient's address (destination address), and the body of the message, all encoded in accordance with these protocols. As noted above, the body of the message typically includes ASCII-encoded text and may also include a digitized image or audio attachment.

To retrieve email from a service provider, the subscriber uses a computer and a modem, under the control of software that is typically provided by the service provider, to call and communicate with the service provider's computer via the telephone system. When the service provider's computer answers, it typically queries the subscriber for a username and password. If the subscriber enters the correct username and password, the service provider's computer "logs in" the subscriber and allows the subscriber to perform various functions, including determining whether email messages intended for the subscriber have been received and stored and, if so, downloading the email messages to the subscriber's computer. When the subscriber is finished, the subscriber logs out and terminates the telephone call.

Software is known that causes a computer and modem to periodically, e.g., once every hour, call a service provider, log in, determine whether any email messages have been received and stored, download any such email messages, and then log out and hang up the call. The Mail Handling System (MHS), produced by Novell Corporation, is an example of such software that can be run on a Novell network server.

It would be desirable to provide a system for conveniently storing and playing back both voice and email messages received via the telephone system. These problems and deficiencies are clearly felt in the art and are solved by the present invention in the manner described below.

SUMMARY OF THE INVENTION

The present invention is an integrated answering machine system for recording both telephone and email messages. The system includes an integrated answering machine device and the method by which it receives and records messages.

The answering machine includes a telephone line interface, a modem, a processor and associated memory, recording means, a speaker, a display, and a keypad or other suitable input means. When the answering machine detects a ring signal on the telephone line to which it is connected, it answers the call. The answering machine plays an outgoing message for the caller to hear and records the caller's incoming voice message. Periodically or at predetermined times, the answering machine may check for email messages by calling a service provider. When the service provider answers the call, the answering machine logs in, downloads and stores at least a portion of email messages that have been received. For example, the answering machine may download only header information that indicates the identity of the sender. Alternatively to periodically calling the service provider, the answering machine may wait for the service provider to call. When the answering machine answers a call, before playing an outgoing message, it may read the telephone number of the calling party using the Calling Number Delivery (CND) service, often referred to as "Caller ID," that many telephone companies provide. If the telephone number is that of the service provider, the answering machine does not play an outgoing message but rather logs in to the service provider and downloads email messages or portions thereof. Alternatively to reading the calling party's telephone number, the answering machine may determine if the calling party is the service provider by detecting a unique predetermined tone or sequence of tones, e.g., "touch-tone" DTMF tones, that the service provider may transmit.

The answering machine displays at least an indication that messages have been received, but preferably displays additional information. For example, it may display the number of calls and email messages received. It may also display the time and date of email and voice messages. It may also display the identities of email senders. Similarly, it may display the telephone numbers or corresponding names of callers who left voice messages, which it may obtain using the CND service or by decoding predetermined tones, e.g., DTMF tones, that identify the caller.

A user can view the display and review the messages. If the email and voice messages are identified individually on the display, the caller may select an individual message to review. Voice messages are played through the speaker, and email messages are provided on the display. If the entire email message has been stored, the body of the message is retrieved from memory and displayed. If only a portion of the selected email message, such as the header, has been stored, the answering machine calls the service provider and downloads the remaining portion of the message and displays it. At that time it may download any other messages that have been received. If a selected email message includes a voice attachment, the answering machine plays that attachment through the speaker as well as displays any text in the body of the message.

The system of the present invention allows a user to conveniently record and review both voice and email messages using an integrated answering machine connected to the user's telephone line.

The user may also compose either an email message or a voice message and send the message via the Internet to a remote email address. This composed message may be a reply to a previously received message.

In addition, the answering machine may include password protection. The user may be required to properly enter a password or code before the messages are displayed or played.

The answering machine may be accessed via a remote computer, such as a portable laptop computer. This remote computer may place a call to the answering machine via a data modem, and may provide DTMF or calling tones or modem data protocols that will provide commands to the answering machine. These commands may include commands that allow the remote user to forward messages, reply to messages, clear all messages, and record a new outgoing message. The answering machine may send and receive virtually any type of data, binary, ASCII, voice, sound and graphics.

The answering machine may also perform the above functions on a PBX telephone system. Each user on the PBX system may perform all functions described above from the user's telephone extension. The answering machine preferably sends and receives email securely for each PBX user.

An exemplary sequence of events that reveals the convenience and ease-of-use of the present invention is as follows: A user may look at the answering machine and visually determine whether messages have arrived. The user can listen to all voice messages and display all text messages. For each Internet message, the user can immediately reply by pressing a "REPLY" key or by typing a message and pressing the "REPLY" key.

The answering machine may support all common email protocols, including the TELESCRIPT protocol.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIGS. 2-1 and 2-2 are a flow diagram illustrating a method for receiving and storing messages in the answering machine;

FIG. 4 illustrates the display of the answering machine;

DESCRIPTION OF PREFERRED EMBODIMENTS

Figure 1:
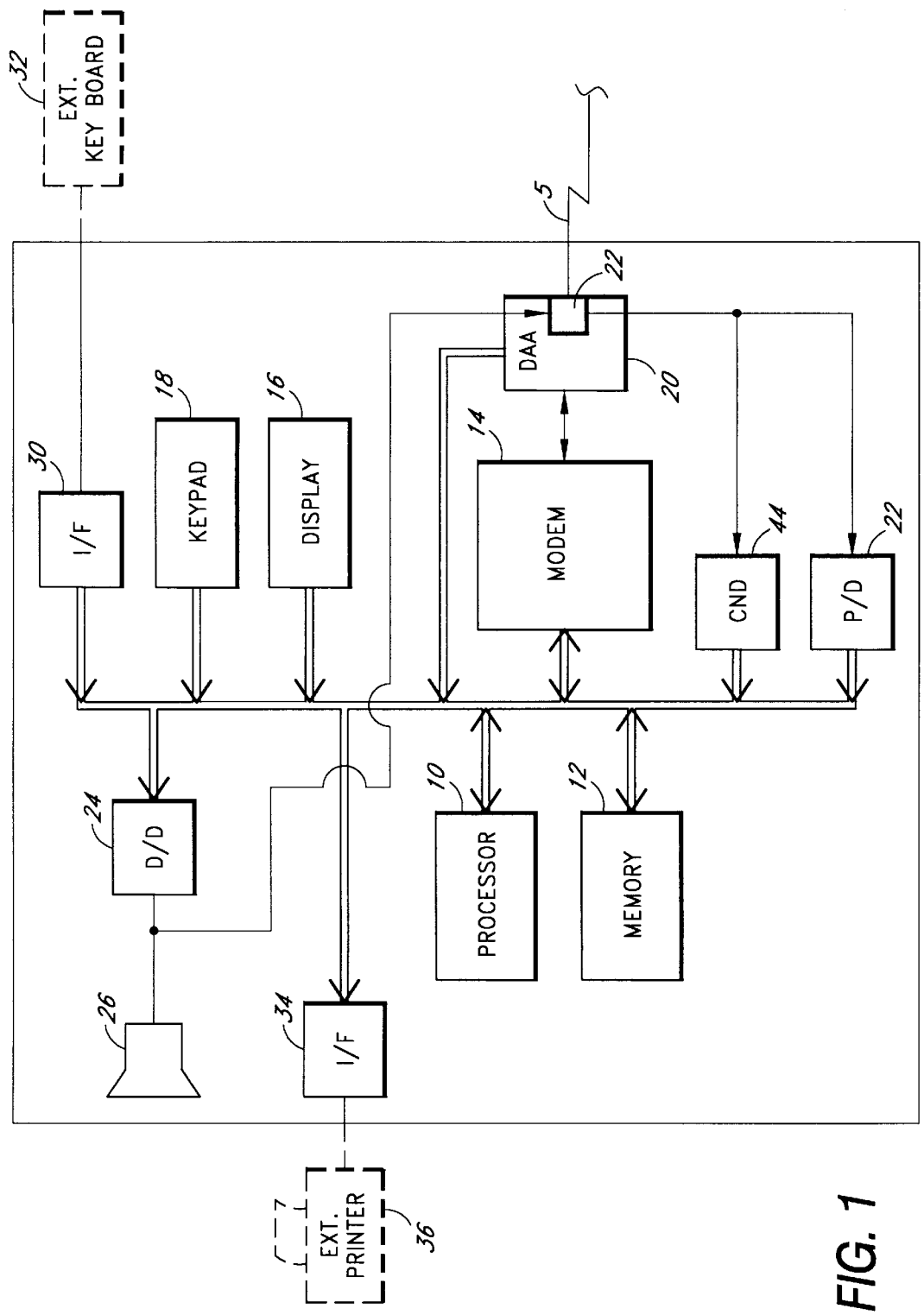
FIG. 1 is a schematic illustration of an Internet answering machine.

As illustrated in FIG. 1, an Internet answering machine is connectable to a telephone line 5 and comprises a processor 10, memory 12, a modem 14, a display 16, a keypad 18, and a data access arrangement (DAA) 20, an analog-to-digital (A/D) converter 22, a digital-to-analog (D/A) converter 24 and a speaker 26. As described below in further detail, the answering machine allows a user to review both voice and email messages that are received via telephone line 5. Incoming email messages are stored directly in memory 12 under the control of processor 10. Incoming voice messages are digitized by A/D converter 22 and stored in memory 12 under the control of processor 10. Processor 10 displays information on display 16 to notify the user of messages that have been received. The user may enter commands on keypad 18 to cause processor 10 to retrieve email and voice messages from memory 12 and display the email messages on display 16 and play the voice messages through speaker 26 via D/A converter 24.

Processor 10 is preferably an economical 8-bit microprocessor or microcontroller, such as an Intel 80186 or NEC V-25. Nevertheless, any processor or combination of processors or equivalent programmable control logic capable of being programmed to perform the method of the present invention, as described below, is suitable.

Memory 12 stores suitable program instructions for operating processor 10 in accordance with the method of the present invention described below. Memory 12 also preferably stores incoming voice and email message data in accordance with the method of the present invention described below. Nevertheless, a separate memory may be provided for recording the message data. Memory 12 preferably includes non-volatile Random Access Memory (RAM) for storing program instructions, and any suitable combination of static RAM (SRAM) memory, dynamic RAM (DRAM) memory, flash memory, credit-card memory, or disk memory for storing message data. Although the preferred means for recording message data is memory 12, any suitable recording means may be used. For example, voice message data is particularly suitable for recording on magnetic tape cassettes because that medium has a large capacity and is economical in comparison to solid-state memory. In such an embodiment, a suitable tape recording mechanism would be provided.

Modem 14 preferably has an operating speed of 14.4 kbps or greater and preferably supports ITU V.34, V.32bis, V.32, V.22bis, V.21 and Bell 212 data communication standards.

Display 16 is preferably a small, economical LCD display that displays several lines of text to enable a user to read email messages, as described below. Nevertheless, any suitable, compact display may be used.

As described below, keypad 18 preferably has dedicated keys that initiate functions such as displaying email messages, scrolling through lines on the display, and deleting email messages as well as functions commonly performed by conventional telephone answering machines, such as recording outgoing voice messages, playing stored (incoming) voice messages and fast-forwarding through incoming voice messages. Nevertheless, a compact, economical typewriter-style ("QWERTY") keyboard, such as the type having membrane switches, is also suitable. As described below, a full "QWERTY" keyboard would allow a user to compose and send email messages as well as receive them.

DAA 20 provides the electrical interface between modem 14 and telephone line 5. Telephone line 5 is plugged into the RJ-11 jack 28 of DAA 20. In the United States DAA 20 will conform to the requirements of Federal Communications Commission (FCC) Part 68. Suitable DAAs are commercially available from numerous manufacturers.

A serial port 30 may be provided to facilitate interfacing an external "QWERTY" keyboard 32. A parallel port 34 may also be provided to facilitate interfacing a printer 36. As noted above, a full "QWERTY" keyboard enables a user to compose and send email messages as well as receive them. Printer 36 would allow a user to print received email messages.

Figures 1, 2:
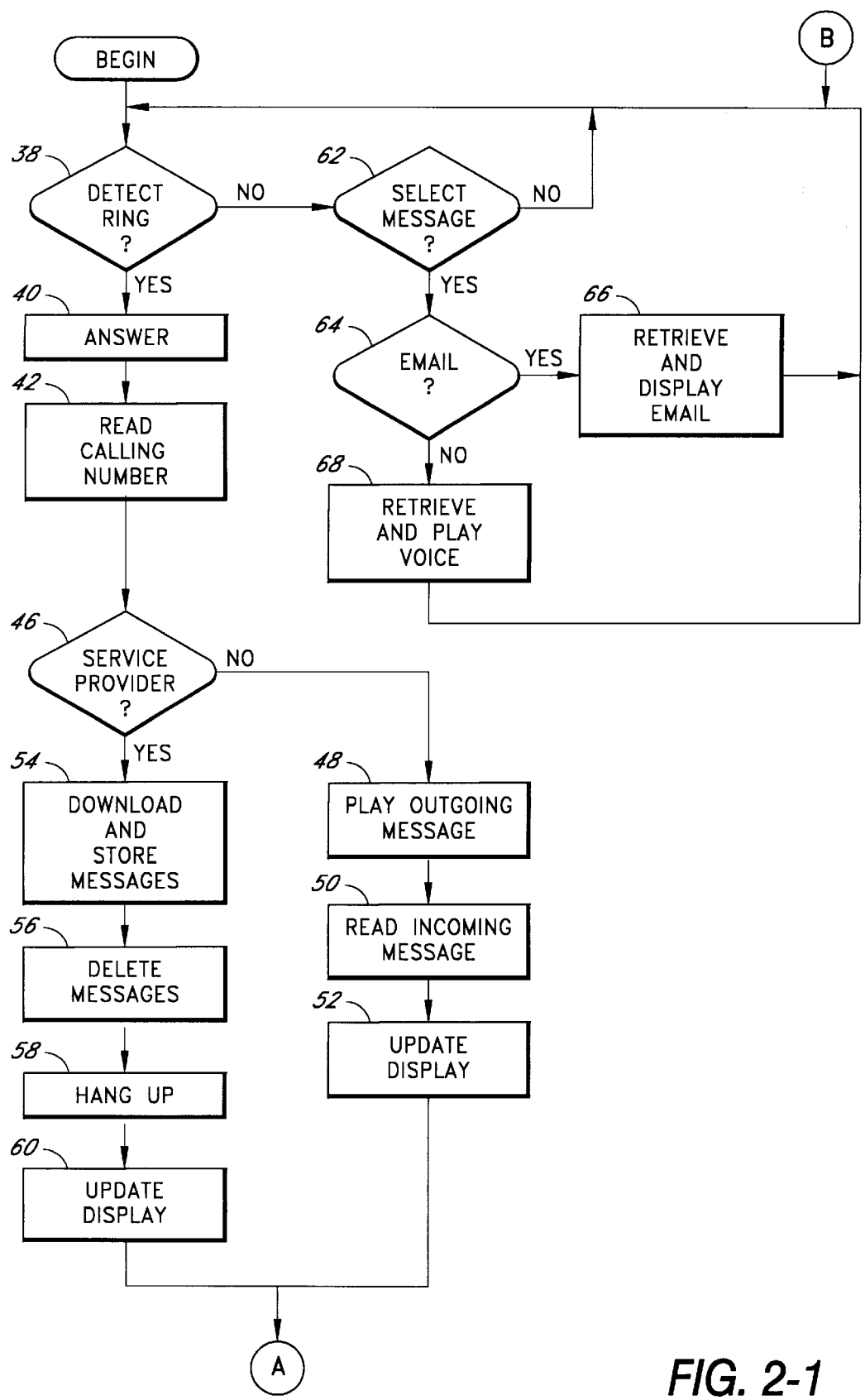
Figure 2:
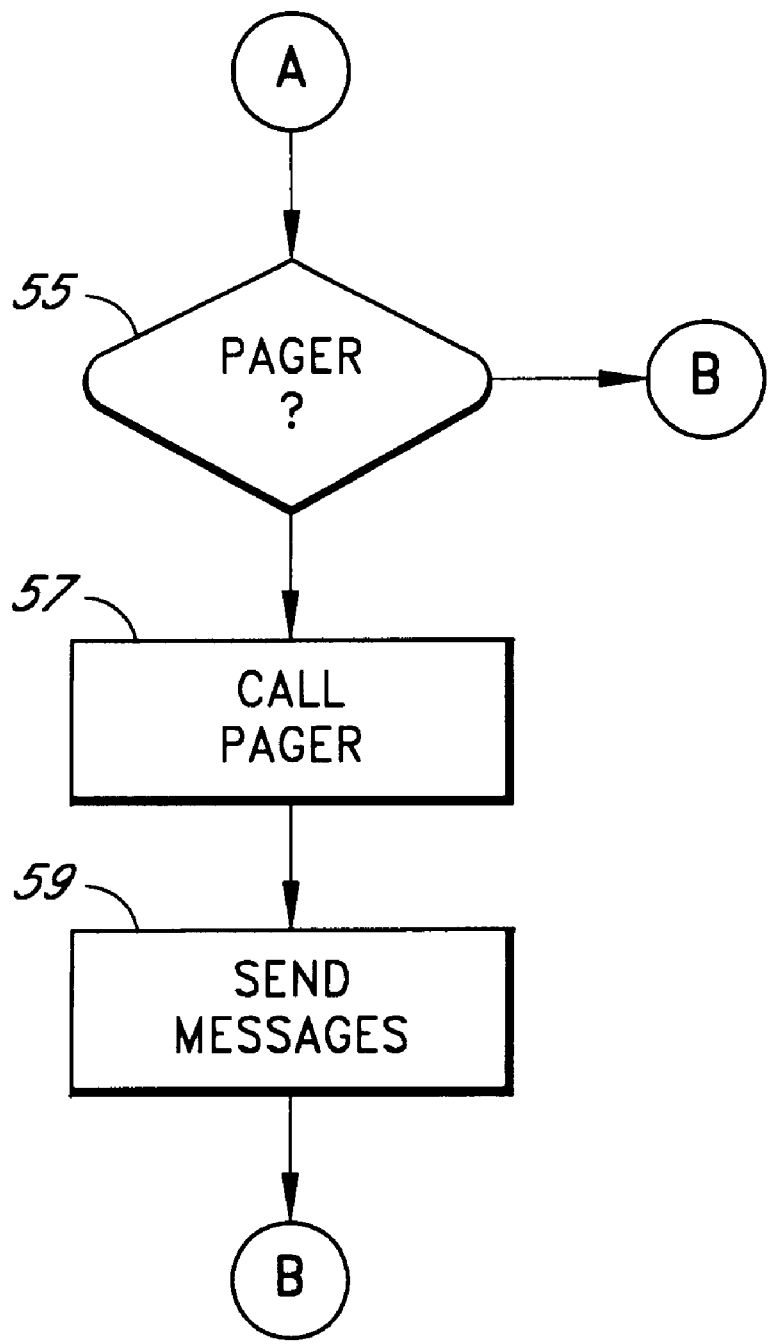

A method by which the answering machine receives messages and the user reviews them is illustrated in FIG. 2. Persons of skill in the art will readily be capable of writing suitable software and/or firmware to implement this method. At step 38 processor 10 determines whether DAA 14 has received a ring signal on telephone line 5. If a ring signal is received, DAA 14 answers the call at step 40 by placing telephone line 5 in the off-hook state. At step 42 processor 10 uses Calling Number Delivery (CND) circuit 44 to attempt to read the telephone number associated with the caller. In areas in which the local telephone company provides CND service, the number is encoded in the ring signal on the first ring. Alternatively, in other embodiments the calling number may be decoded from DTMF tones or calling tones that the caller provides. Circuit 44 decodes the number and makes it available to processor 10. At step 46 processor 10 compares the number to a pre-stored number, which the user may enter into the system via keypad 18 when initially configuring or setting-up the system. (The configuring process may be controlled by suitable set-up software that persons of skill in the art will readily be capable of producing to supplement and facilitate the present method.) The pre-stored number should be that of the user's on-line service provider. Those of skill in the art will appreciate that processor 10 may compare the number to several pre-stored numbers if the user subscribes to several on-line service providers. If the number is not that of the user's on-line service provider, or if CND circuit 44 was unable to read a telephone number in the ring signal, at step 48 processor 10 plays a pre-recorded outgoing message. Processor 10 retrieves the message from memory 12 and provides it to D/A converter 24. The resulting outgoing audio message is transmitted to telephone line 5 via DAA 20. In response to the outgoing message, the caller may leave a voice message. A/D converter 22 receives the incoming audio message from telephone line 5 via DAA 20. At step 50 processor 10 stores the resulting message data in memory 12. At step 52 processor 10 updates display 16 to reflect the incoming voice message, as described below. (The term "audio message" is sometimes used herein synonymously with the term "voice message"; while a caller typically speaks into the telephone handset to leave a message, the caller may, of course, play music or provide any other type of audible signal.) At step 55 processor 10 determines whether an option has been selected that activates the recipient's pager (not shown) to provide notification that a message has been received. The user may select this paging option using the set-up software. If the option is not selected, processor 10 then returns to step 38 to await either another ring signal or a message selection by the user, as described below. If the option is selected, processor 10 initiates a telephone call to a predetermined pager number that the user specifies at set-up time. At step 59 processor 10 sends at least an indication to the pager that a message has been received. If the pager has text display capability, however, processor 10 preferably sends the caller's telephone number. Processor 10 then returns to step 38.

Using the set-up software, the user may configure the above-described paging function to occur only upon predetermined events. For example, the answering machine may page the user upon detecting a predetermined telephone number using CND circuit 44. Also, the answering machine may page the user only if, upon examining all of the header information in the user's email "box", it finds information that matches predetermined information the user specified at set-up time. Thus, for example, the answering machine can initiate a page if it finds an email message having a fax attachment. It may also initiate a page, for example, if the sender places a predetermined identifier or symbol within a predetermined field in the header.

If, at step 46, processor 10 determines that the caller's telephone number is a pre-stored number of an on-line service provider, processor 10 establishes data communication with the on-line service provider via modem 14. (As used in this context, the term "on-line" service provider refers, of course, to the service provider's computer and its associated telecommunications equipment, rather than the business entity.) At step 54 processor 10 downloads email messages from the on-line service provider. The on-line service provider may call the answering machine in this manner either periodically, e.g., once per hour, at predetermined times of day, or whenever it receives an email message addressed to the user. The on-line service provider may receive these email messages via the Internet or locally from other subscribers to the on-line service. Because the user is actually downloading copies of the email messages and because on-line service providers typically do not automatically delete messages that a user has downloaded, at step 56 processor 10 may cause the on-line service provider to delete the messages. Deleting messages in this manner is not necessary, but it is desirable to prevent large numbers of email messages from accumulating because on-line service providers may charge users for their storage. At step 58 processor 10 terminates communication with the on-line service provider and causes modem 14 to hang up the call. At step 60 processor 10 updates display 16 to reflect the received email messages, as described below. At step 55 processor 10 determines whether the paging option described above has been selected. If the option is not selected, processor 10 then returns to step 38 to await either another ring signal or a message selection by the user, as described below. If the option is selected, processor 10 initiates a telephone call to the predetermined pager number and sends at least an indication to the pager that a message has been received. If the pager has text display capability, however, processor 10 preferably sends a portion of the received message information, such as the header of each email message. Processor 10 then returns to step 38 to await either another ring signal or a message selection by the user.

As described below in further detail, the user may review any message indicated on display 16. At step 62 processor 10 determines if the user selected a message for review. If the user selects a message for review, at step 64 processor 10 determines whether the message is an email message or a voice message. Each message stored in memory 12 has an associated tag stored with it that includes an index number and a type. The index number corresponds to the position of the message on display 16, as described in further detail below. The type indicates whether the message is email or voice. At step 64 processor 10 examines the type. If the selected message is email, at step 66 processor 10 retrieves the message data from memory 12 and displays it for the user on display 16. The displayed information -includes the header and any accompanying routing and forwarding information included as part of the received message, as is typical in conventional email display software. If the email message includes a voice attachment, processor 10 provides the attachment data to D/A converter 24. The resulting audio attachment is played for the user via speaker 26. If printer 36 is connected, processor 10 may also provide the message data to parallel port 34 for printing. Alternatively, processor 10 may defer printing until such time as the user enters a print command (not shown) on keypad 18. If the selected message is voice, at step 68 processor 10 retrieves the message data from memory 12 and provides it to D/A converter 24. The resulting message is played for the user via speaker 26. Alternatively, the user may enter a "reply" command on keypad 18, preferably by pressing a dedicated "REPLY" button (not shown). The user may compose text for the reply using keypad 18 or external "QWERTY" keyboard 32. The user may include voice in the reply by speaking into a microphone (not shown). Processor 10 may obtain the email address of the intended recipient from the header of the received message, package the reply into the proper email format, and cause it to be transmitted back to the sender of the original message. Processor 10 then returns to step 38 to await another ring signal or another message selection by the user.

It should be noted that, although steps 62–68 are illustrated in FIG. 2 as performed only if the result of step 38 is negative, persons of skill in the art will appreciate that, using suitable well-known multitasking programming techniques, the answering machine may retrieve messages from the on-line service provider while the user is reviewing messages. Similarly, although FIG. 2 illustrates a sequential flow to the method for purposes of clarity, those of skill in the art will appreciate that an interrupt-driven approach may be equally suitable. The same should be noted with respect to the method illustrated in FIG. 3.

Although a user may, as described above, select and review messages via keypad 18 and speaker 26, a user may also review voice messages and voice attachments to email messages via a remote telephone. The user can call the answering machine and enter commands on the telephone keypad to review stored messages. Such methods are well-known in conventional answering machines and not described in further detail herein.

Alternatively to the above-described method, in which the on-line service provider calls the answering machine to deliver email messages, the answering machine may at predetermined times of day or periodically, e.g., every hour, call the on-line service provider to poll whether any email messages addressed to the user have been received and, if so, download and store the email data. Persons of skill in the art will readily be capable of writing suitable software to implement the method illustrated in FIG. 3. At step 70 processor 10 resets or initializes a timer that determines the period that processor 10 waits between successive pollings of the on-line service provider. The timer begins to count and runs continuously until reset. The user may pre-store the desired period, such as one hour, during the initial system set-up noted above. At step 72 processor 10 polls the timer to determine whether the pre-stored period has elapsed. If the period has elapsed, at step 74 processor 10 initiates a telephone call to the on-line service provider via modem 14 and DAA 20. When the on-line service provider answers, processor 10 establishes communication and logs in at step 76. At step 78 processor 10 queries the on-line service provider whether any email messages addressed to the user have been received. If email messages have been received, processor 10 downloads the messages and stores them in memory 12 at step 80, in the same manner as described above with respect to step 54 of FIG. 2. At step 82 processor 10 may deleted the downloaded messages as described above with respect to step 56 of FIG. 2. At step 84 processor 10 logs out, terminates communication and hangs up the call. If, at step 78, processor 10 determines that no email messages were received, processor 10 proceeds directly to step 84. Processor 10 then returns to step 70 and resets the timer.

If, at step 72, processor 10 determines that the pre-set time has not elapsed, the user may select a message. At step 86 processor 10 determines if the user selected a message for review. If the user selects a message for review, at step 88 processor 10 determines whether the message is an email message or a voice message. If the selected message is email, at step 90 processor 10 retrieves the message data from memory 12 and displays it for the user on display 16 and, if the email message includes a voice attachment, plays the attachment at step 92 as described above with respect to step 68 of FIG. 2. As similarly described above, if printer 36 is connected, processor 10 may also cause it to print the message. Processor 10 then returns to step 72 until either the pre-set time period elapses or the user selects another message.

As noted above, the user may select to review any of the voice and email messages that display 16 indicates have been received. A typical output of display 16 is illustrated in FIG. 4. Display 16 may display any number of parameters that reflect or correspond to the message data that has been stored in memory 12. For example, the parameters displayed on display 16 may consist of only an indication that at least one message has been received. It may thus display an alphanumeric message, such as "MESSAGES HAVE BEEN RECEIVED." More economically, in such an embodiment, display 16 would be a single LED that would be blink if messages have been received. Alternatively, for example, the parameters displayed on display 16 may include an indication of the number of messages received. It may thus display the alphanumeric message "3 MESSAGES HAVE BEEN RECEIVED", as shown at the top of the display output illustrated in FIG. 4. In an embodiment in which the displayed parameters consist only of the number of messages received, display 16 would more economically be a single 7-segment LED numeric display.

Alternatively, or in addition to these parameters, display 16 may provide other parameters, such as information identifying the sender, whether the message is email or voice mail, and the time and date the message was received. If the message was email, display 16 may also display the subject of the message, which is typically included in an email header.

As illustrated in FIG. 4, the output of display 16 preferably includes a line of alphanumeric information for each message that has been received. Processor 10 may display these lines in the temporal order the corresponding messages were received or in any other order selected by the user during system set-up, such as alphabetic order by the sender's name or by type of message. Such display techniques are well-known in email software and not described further herein. The order in which the lines are displayed may correspond to the index number, described above, that is stored with the message in memory 12.

The display output is divided into columns labeled "FROM", "TYPE", "SUBJECT", "DATE" and "TIME". The exemplary output illustrated in FIG. 3 indicates the three messages that have been received. The "FROM" column relating to the first exemplary message (the line immediately below the column labels) indicates that it was received from a caller at telephone number "619-555-1234". As noted above, processor 10 obtains this number using CND circuit 44. Processor 10 stores the number in memory 12 along with the message at the time it is received, as described above. As known in the art, a telephone number obtained using CND may be converted to an mnemonic tag, such as the caller's name, and the tag can be displayed in place of or in addition to the number.

Memory 12 may include a pre-stored correspondence or "telephone directory" between telephone numbers and the names of individuals or other identifying information. The user may store this telephone directory information during system set-up. The user may also choose to automatically store email addresses of some or all senders into the telephone directory. The set-up software can configure the answering machine to automatically strip the sender's email address from each message it receives and store that address in the telephone directory along with the sender's name.

If CND is not available or CND circuit 44 cannot read a telephone number, the indication "<UNKNOWN>" may be displayed, as shown in the line corresponding to the second exemplary message. The "TYPE" column indicates that the first message is voice. The "SUBJECT" column indicates "<NONE>" because such information relates only to email messages. The "DATE" and "TIME" columns indicate the date and time the message was received. Processor 10 includes an internal clock to maintain the current date and time, which the user can set during system set-up. The "FROM" column relating to the third exemplary message indicates that it was received from a sender at email address "ROBIN@CR.COM". As noted above, processor 10 obtains the sender's email address from the message header, which is stored in memory 12 with the other information relating to that message. In a manner similar to the above-noted conversion of a telephone number to a mnemonic tag, such as the caller's name, processor 10 can use a directory pre-stored in memory 12 to convert the email address into a corresponding tag and display the tag in place of or in addition to the email address. The "TYPE" column indicates that the third message is email. Processor 10 obtains the text shown in the "SUBJECT" column from the message header. The "DATE" and "TIME" columns indicate that the message was received after the first message. Because the number of email messages that have been received may exceed the number of lines simultaneously displayable on display 16, keypad 18 preferably allows a user to enter commands for scrolling through displayed lines. Other display manipulations and customizations commonly used in email software may also be included. Such display techniques are well-understood in the art and not described herein.

Although the output illustrated in FIG. 4 is preferred, it should be noted that the displayed parameters corresponding to email messages may include not only information obtained from the header, but the entire header or even the entire email message. Email messages or portions thereof may be appended to the display output in the order the email messages are received. The user may use keypad 18 to scroll through the display output.

Figure 3:
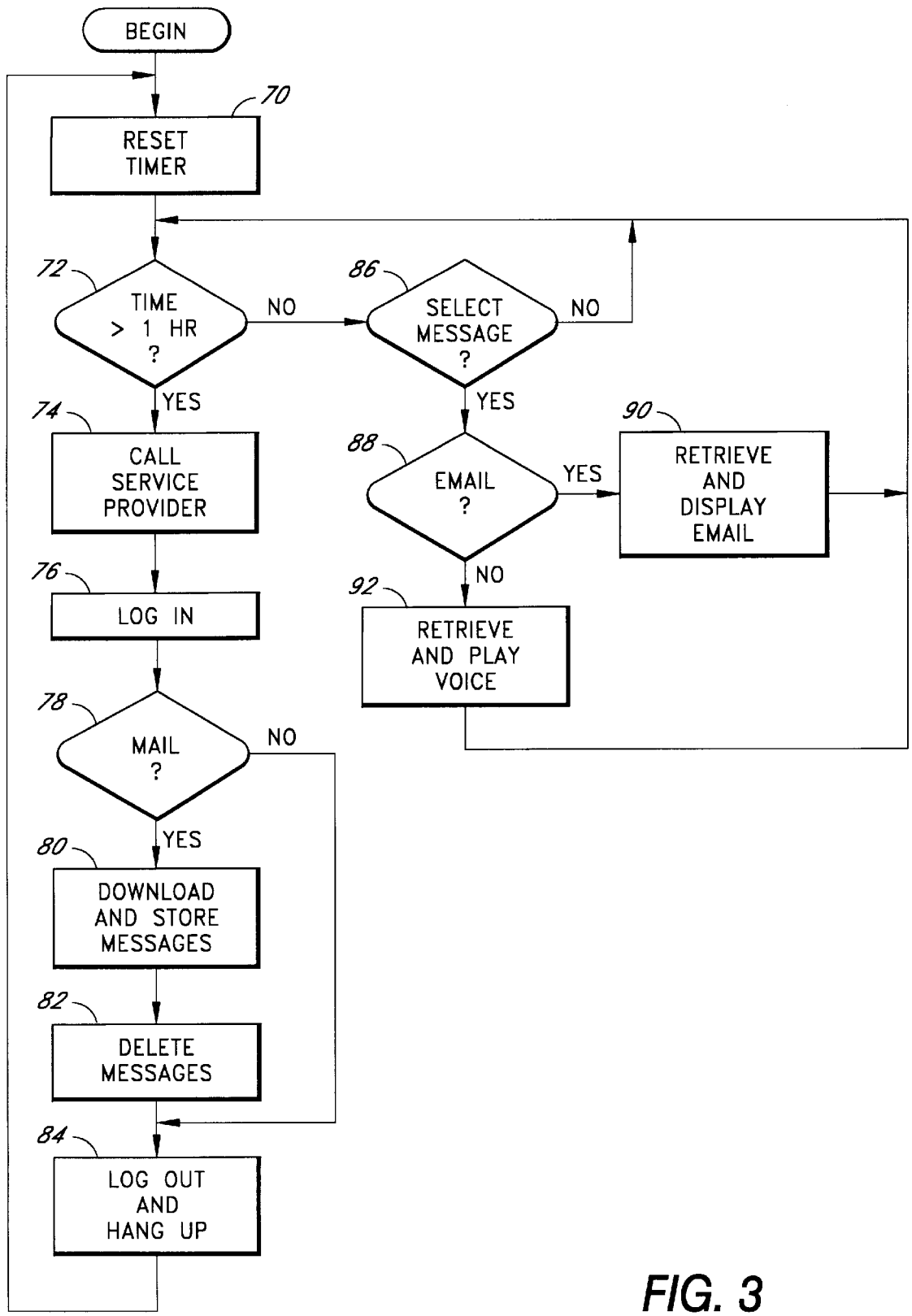
FIG. 3 is a flow diagram illustrating an alternate method for receiving and storing messages in the answering machine.
Figure 5:
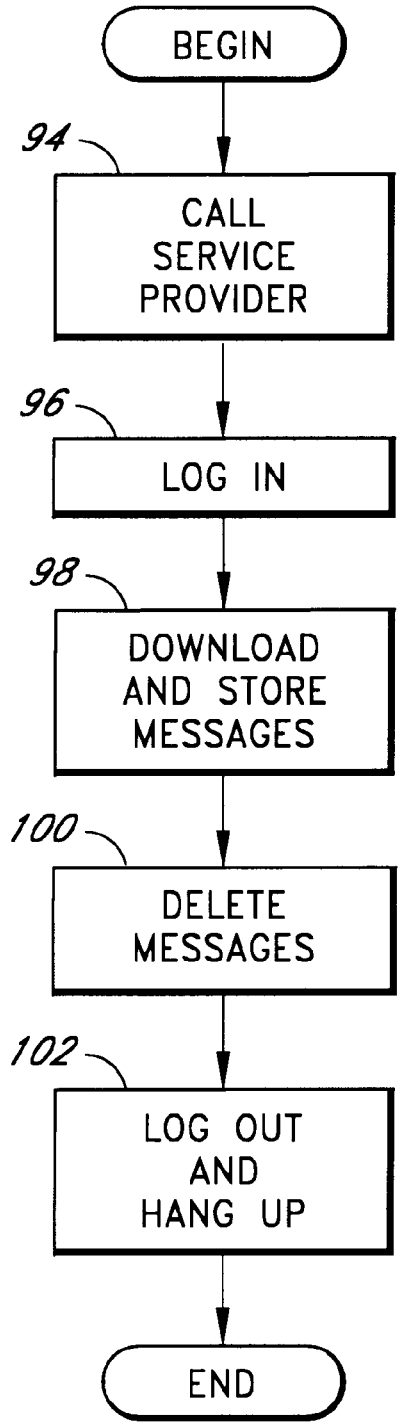
FIG. 5 is a flow diagram illustrating a method for retrieving the remaining portions of messages.

At steps 54 and 80 of FIGS. 2 and 3, respectively, either the entire email message or only a portion of it may be downloaded and stored. For example, only the header may be downloaded and stored. As illustrated in FIG. 5, the remaining portions of the message may be retrieved only if the user chooses to read the message. This alternative embodiment minimizes memory requirements and minimizes the time required for each initial telephone transaction with the on-line service. In this embodiment steps 56 and 82 of FIGS. 2 and 3, respectively, in which the downloaded message is deleted from the service provider's computer, would not be performed. In this embodiment the following method, illustrated in FIG. 5, would be included in steps 66 and 90 of FIGS. 2 and 3, respectively, in which the selected message is retrieved from memory 12 and displayed.

At step 94 processor 10 initiates a telephone call to the on-line service provider via modem 14 and DAA 20. When the on-line service provider answers, processor 10 establishes communication and logs in at step 96. At step 98 processor 10 downloads the messages and stores them in memory 12. Although portions of the messages, such as the headers or portions of the headers, are already stored in memory 12, processor 10 may nonetheless download the entire message. Alternatively, only the portions of the message that have not been previously downloaded are downloaded at this time. At step 100 processor 10 may deleted the downloaded messages. At step 102 processor 10 logs out, terminates communication and hangs up the call. Processor 10 then displays the downloaded email messages, including playing audio attachments, as described above with respect to steps 66 and 90 of FIGS. 2 and 3.

It is preferred, at step 98, that processor 10 download all messages that have been received, i.e., including the non-selected messages, or at least a number of the non-selected messages, since it is likely that the user will wish to subsequently read additional messages. Nevertheless, it is suitable for processor 10 to log out, hang up, wait until the user selects another message, establish another telephone connection, log back in, and download the next selected message.

When a selected message is displayed, processor 10 preferably replaces the message summary output illustrated in FIG. 4 with the selected email message. Alternatively, if the user selects an option during set-up, processor 10 may display both the message and message summary in a "split-screen" mode. Because an email message is likely to have a length greater than the capacity of display 16, keypad 18 preferably allows a user to enter commands for scrolling through the message and performing other text manipulation functions commonly provided in conventional email systems. When the user is finished reviewing the displayed email messages, the user may enter a command on keypad 18 to return to the message summary display. Alternatively, processor 10 may return to the message summary display after a pre-set amount of time, such as 1 minute, elapses during which time the user does not scroll though the message or enter any other commands via keypad 18.

Figure 6:
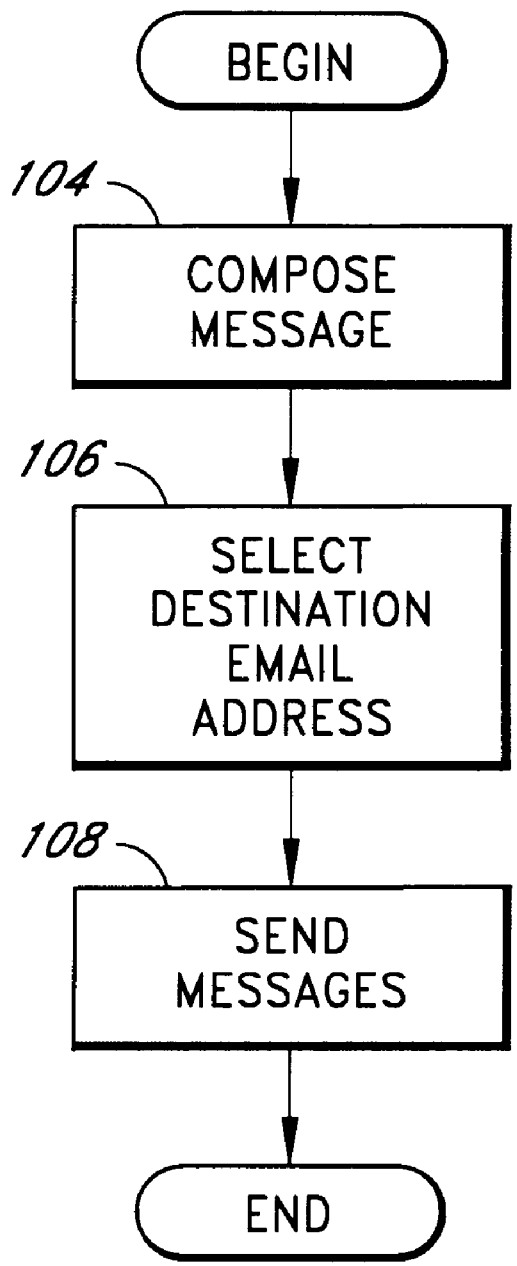
FIG. 6 is a flow diagram illustrating a method for composing and transmitting messages using the answering machine.

The answering machine also has a robust capacity to send both email and voice mail messages. A method by which the answering machine can be used to compose and send such messages is illustrated in FIG. 6. At step 104 a user may use keypad 18 or external "QWERTY" keyboard 32 to compose text messages or use a microphone (not shown) to compose voice messages. At step 106 the user selects a destination address. The user may do so by entering the destination email address using keypad 18 or external "QWERTY" keyboard 32, or by simply pressing the "REPLY" key (not shown) to send the newly composed message to the previous sender. The user may select the destination address by using keypad 18 to choose an entry in the telephone directory stored in memory 12. As described above, the directory contain the name of the destination user as well as the corresponding destination on-line email address. A user may add, delete or modify entries in the directory using keypad 18. At step 108 processor 10 sends the message via modem 14.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for receiving messages using an integrated answering machine, comprising:

answering a telephone call in response to a ring signal on a telephone line at said answering machine;

providing an indication to a caller via said telephone line that said call has been answered;

receiving a voice message from said caller via said telephone line;

storing at least a portion of said voice message in said answering machine;

said answering machine automatically querying a remote computer periodically to determine whether any e-mail messages are stored in the remote computer, including determining whether a telephone number associated with an incoming telephone call is a predetermined service provider number; and providing an indication as to whether any e-mail messages are stored in said remote computer.

2. The method defined in claim 1, further including said answering machine initiating a telephone connection with said remote computer and downloading copies of e-mail messages stored in said remote computer into said answering machine.

3. An integrated answering machine for receiving telephone messages via a telephone line and e-mail messages from a remote computer also via the telephone line, the answering machine comprising:

a telephone line interface connectable to the telephone line;

a modem coupled to the telephone line interface;

a processor configured for controlling the receipt and recording of telephone messages, for automatically periodically establishing a connection with a remote computer via the modem and the telephone line and independently querying the remote computer to determine whether any e-mail messages are stored in the remote computer, and for determining the telephone number associated with an incoming telephone call, and if said telephone number is a predetermined service provider number, downloading copies of e-mail messages stored in said remote computer, the processor being coupled to the telephone line interface and to the modem;

a display for indicating the results of the query of the remote computer; and a memory coupled to the processor for storing at least a portion of the telephone messages.

4. An integrated answering machine for receiving telephone messages via a telephone line and e-mail messages from a remote computer also via the telephone line, the answering machine comprising:

a telephone line interface connectable to the telephone line;

a modem coupled to the telephone line interface;

a processor configured for controlling the receipt, recording and playback of telephone messages, for automatically determining the telephone number associated with an incoming telephone call, and if said telephone number is a predetermined service provider number, automatically downloading copies of e-mail messages stored in said remote computer, and for controlling the receipt, storing and display of at least a portion of e-mail messages received via said telephone line, the processor being coupled to the telephone line interface and to the modem; and a memory coupled to the processor for storing at least a portion of the e-mail messages.

5. The integrated answering machine defined in claim 4, wherein said processor further includes means for establishing a telephone connection with said remote computer via said modem and said telephone line, and for downloading copies of e-mail messages stored in said remote computer.

* * * * *